(12) United States Patent
Chang et al.

(10) Patent No.: US 7,705,927 B2
(45) Date of Patent: Apr. 27, 2010

(54) PIXEL STRUCTURE HAVING A SECOND TFT ELECTRICALLY CONNECTED TO A COUPLING ELECTRODE FORMED OVER AND ELECTRICALLY INSULATED FROM THE DATA LINE

(75) Inventors: Ming-Hsuan Chang, Taoyuan County (TW); Chih-Chung Liu, Changhua County (TW); Yueh-Ping Chang, Kaohsiung (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 139 days.

(21) Appl. No.: 11/965,739

(22) Filed: Dec. 28, 2007

(65) Prior Publication Data
US 2008/0158464 A1 Jul. 3, 2008

(30) Foreign Application Priority Data
Dec. 28, 2006 (CN) .................. 2006 1 0172819

(51) Int. Cl.
G02F 1/136 (2006.01)
G02F 1/1343 (2006.01)
(52) U.S. Cl. .................. 349/48; 349/139; 349/143; 349/144
(58) Field of Classification Search ............ 349/144, 349/47, 48, 143
See application file for complete search history.

(56) References Cited

U.S. PATENT DOCUMENTS

| 2002/0176030 | A1* | 11/2002 | Matsumoto | 349/43 |
| 2004/0001167 | A1 | 1/2004 | Takeuchi et al. | |
| 2005/0030439 | A1 | 2/2005 | Lyu | |
| 2005/0030460 | A1 | 2/2005 | Kim et al. | |
| 2006/0017862 | A1* | 1/2006 | Song et al. | 349/42 |
| 2006/0146241 | A1* | 7/2006 | Choi et al. | 349/129 |
| 2006/0227269 | A1* | 10/2006 | Sawasaki et al. | 349/129 |

* cited by examiner

Primary Examiner—Andrew Schechter
Assistant Examiner—Dennis Y Kim
(74) Attorney, Agent, or Firm—Jianq Chyun IP Office

(57) ABSTRACT

A pixel structure including a scan line, a data line, a first sub-pixel, a coupling electrode and a second sub-pixel is provided. The first sub-pixel includes a first thin film transistor (TFT) and a first pixel electrode, and the first pixel electrode is electrically connected to the scan line and the data line via the first TFT. The coupling electrode is disposed above the data line and electrically insulated from the data line. The second sub-pixel includes a second thin film transistor and a second pixel electrode. The second pixel electrode is electrically connected to the second TFT, and the second TFT is electrically connected to the coupling electrode. When seeing an image from a slant direction, color shift of image can be solved by utilizing the pixel structure. Besides, a liquid crystal display panel having the described pixel structure is also provided.

17 Claims, 13 Drawing Sheets

PIXEL STRUCTURE HAVING A SECOND TFT ELECTRICALLY CONNECTED TO A COUPLING ELECTRODE FORMED OVER AND ELECTRICALLY INSULATED FROM THE DATA LINE

CROSS-REFERENCE TO RELATED APPLICATION

This application claims the priority benefit of Chinese application serial no. 200610172819.1, filed on Dec. 28, 2006. The entirety of the above-mentioned patent application is hereby incorporated by reference herein and made a part of this specification.

BACKGROUND OF THE INVENTION

1. Field of the Invention

The present invention generally relates to a pixel structure and a liquid crystal display panel having the pixel structure, in particular, to a liquid crystal display panel and a pixel structure thereof, which can alleviate color shift of image.

2. Description of Related Art

The thin film transistor liquid crystal display (TFT-LCD) is becoming the mainstream in the display market because of its superior characteristics, such as high image quality, high space utilizing efficiency, low power consumption and no radiation etc. Recently, high contrast ratio, fast response time and wide viewing angle are the major demands. In order to reach the achievement, a multi-domain vertically alignment (MVA) TFT-LCD is proposed.

FIG. 1 is a schematic, cross-sectional view showing a conventional MVA TFT-LCD. Referring to FIG. 1, the liquid crystal display panel 100 includes a thin film transistor array substrate 110, a color filter substrate 120 and a liquid crystal layer 130. By means of the protrusions 140 or slit patterns (not shown) formed on the thin film transistor array substrate 110 and the color filter substrate 120, when an electric field is applied between the substrates 110 and 120, the liquid crystal molecules 132 in the liquid crystal layer 130 are rearranged along different orientations to thereby define a four-domain (4 domain) distribution and thus achieve the effect of the wide viewing angle.

Although the MVA TFT-LCD or a horizontal alignment TFT-LCD can achieve the purpose of the wide viewing angle, users still encounter color washout when viewing an image thereon from different viewing angles.

FIG. 2 shows gamma (γ) curves of a conventional MVA TFT-LCD in different viewing angles (θ), (φ=0). Referring to FIG. 2, the ordinate represents the brightness, and the abscissa represents the gray level. As shown in FIG. 2, the larger viewing angle, the worse distortion of the gamma curve, that is, the color shift of image becomes aggravating. The color shift occurs in a large viewing angle when the middle and the low gray level has a higher brightness. Therefore, an efficient method for solving the color shift of image is to decrease the brightness of the middle and the low gray level. The US patent publication No. 2005/0030439 discloses a design of dividing a pixel into two sub-pixels.

FIG. 3 is a schematic, the top view showing a conventional thin film transistor array substrate. Referring to FIG. 3, a first pixel electrode 190a and a second pixel electrode 190b are located in a left region and a right region of a pixel structure 190, respectively. The first pixel electrode 190a is electrically connected to a drain 175 via a contact hole 181. The drain 175 extends underneath to the second pixel electrode 190b. A voltage applied to the second pixel electrode 190b undergoes a voltage drop by the capacitance coupling effect, thus the voltage applied to the second pixel electrode 190b is smaller than that applied to the first pixel electrode 190a. Thereby, the region of the second pixel electrode 190b is darker than that of the conventional one in the middle and the low gray level, while the brightness of the region of the first pixel electrode 190a is similar to that of the second pixel electrode 190b. Therefore, the pixel structure 190 can solve the problem of color shift of image in a large viewing angle.

However, complying with the optimistic response time and the transmittance of various panels with different scales and resolutions, the gap between the protrusions or slits is limited, and the adjustment for the area ratio of the first pixel electrode 190a to the second electrode 190b is accordingly restricted.

In addition, the pixel structure 190 corresponds to the same thin film transistor; the voltage applied to the first pixel electrode 190a and the second pixel electrode 190b respectively are different, which aggravates the flicker phenomenon of the frame.

FIG. 4 is a schematic, the top view showing a color filter substrate corresponding to the thin film transistor array substrate in FIG. 3. Referring to FIG. 3 and FIG. 4, the drain 175 is opaque as being made of metal. In order to avoid the aperture ratio of the pixel structure 190 is decreased; the drain 175 must be disposed corresponding to the protrusion 272, as shown in FIG. 4. However, if an assembly shift occurs in the fabrication of the panel, wherein the drain 175 is not exactly corresponding to the protrusion 272, the aperture ratio of the panel is affected due to the exposure of the drain 175.

SUMMARY OF THE INVENTION

According to the present invention is directed to a pixel structure, a liquid crystal display panel using the pixel structure can eliminate the problem of color shift, make it easy to adjust the area ratio of sub-pixels, and avoid the flicker phenomenon of frame and the loss of aperture ratio.

The present invention is directed to a liquid crystal display panel capable of eliminating the problem of color shift, easy to adjust the area ratio of sub-pixels and preventing the flicker phenomenon of frame and the loss of aperture ratio.

The present invention provides a pixel structure. The pixel structure includes a scan line, a data line, a first sub-pixel, a coupling electrode and a second sub-pixel. The first sub-pixel includes a first thin film transistor and a first pixel electrode, the first pixel electrode is electrically connected to the scan line and the data line via the first thin film transistor. The coupling electrode is disposed over the data line and is electrically insulated from the data line. The second sub-pixel includes a second thin film transistor and a second pixel electrode, the second pixel electrode is electrically connected to the second thin film transistor and the second thin film transistor is electrically connected to the coupling electrode.

According to an embodiment of the present invention, the first thin film transistor has a first width-to-length ratio of channel, the second thin film transistor has a second width-to-length ratio of channel, and the first width-to-length ratio is substantially equal to the second width-to-length ratio.

According to an embodiment of the present invention, an area ratio of the first sub-pixel to the second sub-pixel is in the range from 1:1 to 1:2.

According to an embodiment of the present invention, the first pixel electrode and the second pixel electrode include an alignment slit pattern.

According to an embodiment of the present invention, the pixel structure further comprises an alignment protrusion pattern formed on the first pixel electrode and the second pixel electrode.

According to an embodiment of the present invention, the pixel structure further comprises a common electrode disposed below the first pixel electrode and the second pixel electrode.

According to an embodiment of the present invention, the material of the coupling electrode comprises a transparent conductive material.

According to an embodiment of the present invention, a liquid crystal display panel is provided. The liquid crystal display panel includes a thin film transistor array substrate, a color filter substrate and a liquid crystal layer. The thin film transistor array substrate has a plurality of pixel structures, wherein each of the pixel structures includes a scan line, a data line, a first sub-pixel, a coupling electrode and a second sub-pixel. The first sub-pixel includes a first thin film transistor and a first pixel electrode, wherein the first pixel electrode is electrically connected to the scan line and the data line via the first thin film transistor. The coupling electrode is disposed over the data line, and is electrically insulated from the data line. The second sub-pixel includes a second thin film transistor and a second pixel electrode, the second pixel electrode is electrically connected to the second thin film transistor, and the second thin film transistor is electrically connected to the coupling electrode. The color filter substrate is disposed opposite to the thin film transistor array substrate. The liquid crystal layer is interposed between the thin film transistor array substrate and the color filter substrate.

According to an embodiment of the present invention, the first thin film transistor has a first width-to-length ratio of channel, the second thin film transistor has a second width-to-length ratio of channel, and the first width-to-length ratio is substantially equal to the second width-to-length ratio.

According to an embodiment of the present invention, an area ratio of the first sub-pixel to the second sub-pixel is in the range from 1:1 to 1:2.

According to an embodiment of the present invention, the first pixel electrode and the second pixel electrode of the pixel structure include an alignment slit pattern.

According to an embodiment of the present invention, the thin film transistor array substrate further comprises an alignment protrusion pattern formed on the first pixel electrode and the second pixel electrode.

According to an embodiment of the present invention, the color filter substrate further comprises an alignment protrusion pattern formed thereon.

According to an embodiment of the present invention, the color filter substrate further comprises an alignment slit pattern formed thereon.

According to an embodiment of the present invention, each pixel structure further comprises a common electrode formed below the first pixel electrode and the second pixel electrode.

According to an embodiment of the present invention, the color filter substrate further comprises a common electrode layer.

According to an embodiment of the present invention, the material of the coupling electrode comprises a transparent conductive material.

The first sub-pixel and the second sub-pixel are formed in a single pixel structure, and the voltage applied to the second sub-pixel is different from the voltage applied to the first sub-pixel by utilizing the capacitance coupling effect between the coupling electrode and the data line. In such way, different electric fields are generated in a single pixel structure to make the liquid crystal molecules alignment along different directions in the single pixel structure. Therefore, the color shift of image can be alleviated.

Moreover, because the coupling electrode is disposed over the data line, the problem of the loss of aperture ratio due to the assembly shift during the fabrication of the liquid crystal display panel can be effectively prevented. Furthermore, the area ratio of the first sub-pixel to the second sub-pixel in the pixel structure can be easily adjusted and the flicker phenomenon of frame is eliminated.

These and other exemplary embodiments, features, aspects, and advantages of the present invention described will be more apparent from the detailed description with accompanying drawings.

DESCRIPTION OF THE EMBODIMENTS

Figure 1:
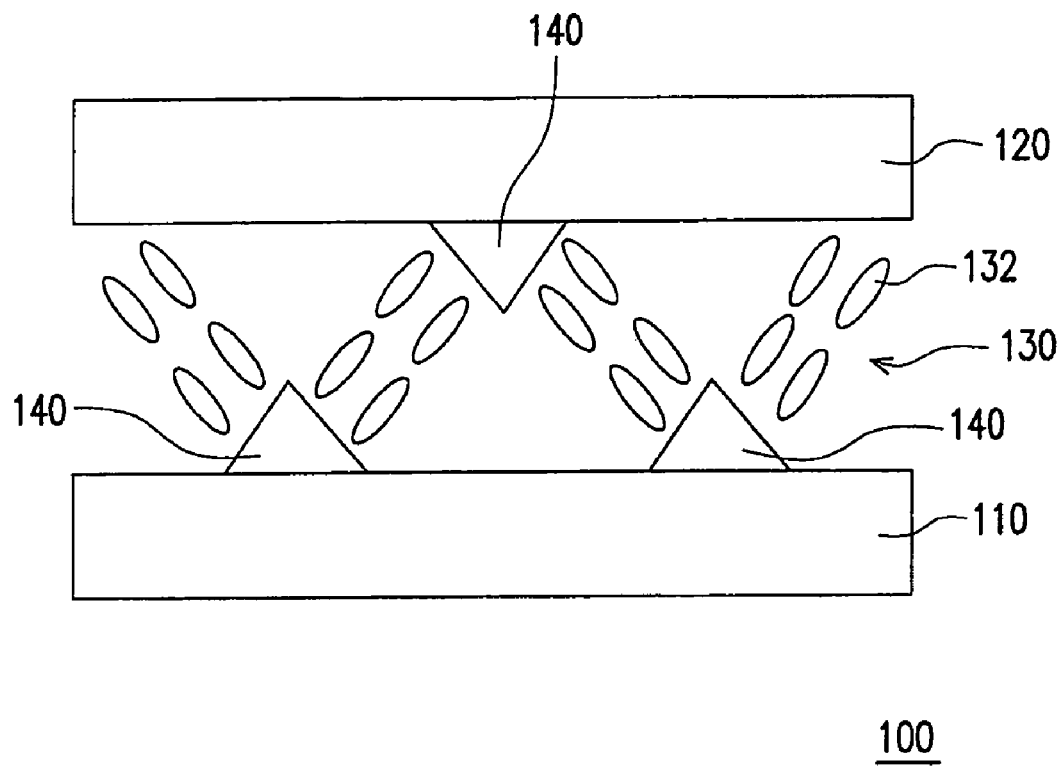
FIG. 1 is a schematic, showing of a cross sectional view of the conventional Multi-domain Vertically Alignment Liquid Crystal Display.
Figure 2:
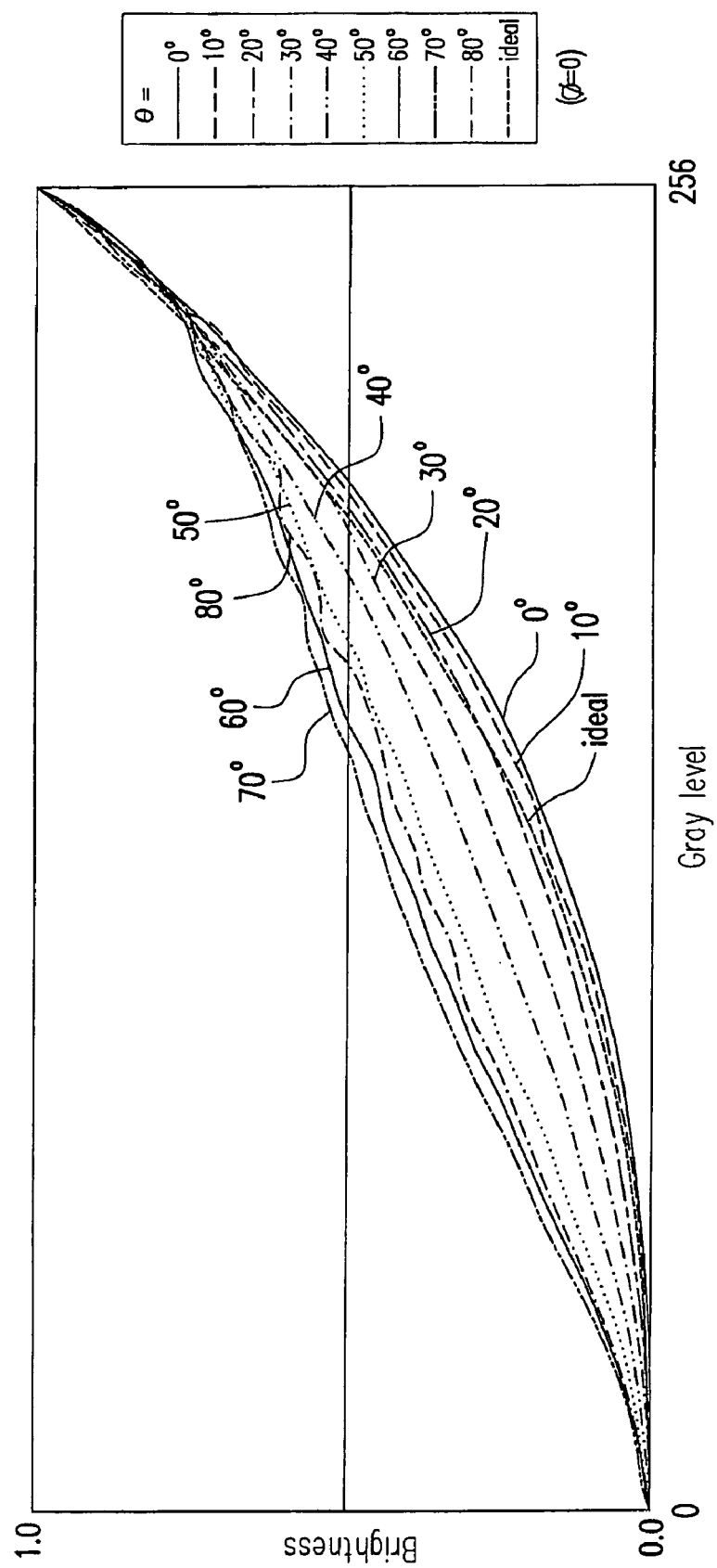
FIG. 2 is a chart showing the gamma curves of the conventional MVA TFT-LCD in different view angles ($\theta$), ($\phi$=0).

Reference will now be made in detail to the preferred present embodiments of the invention, examples of which are illustrated in the accompanying drawings. Wherever possible, the same reference numbers are used in the drawings and the description is referred to the same or like parts.

Figure 5A:
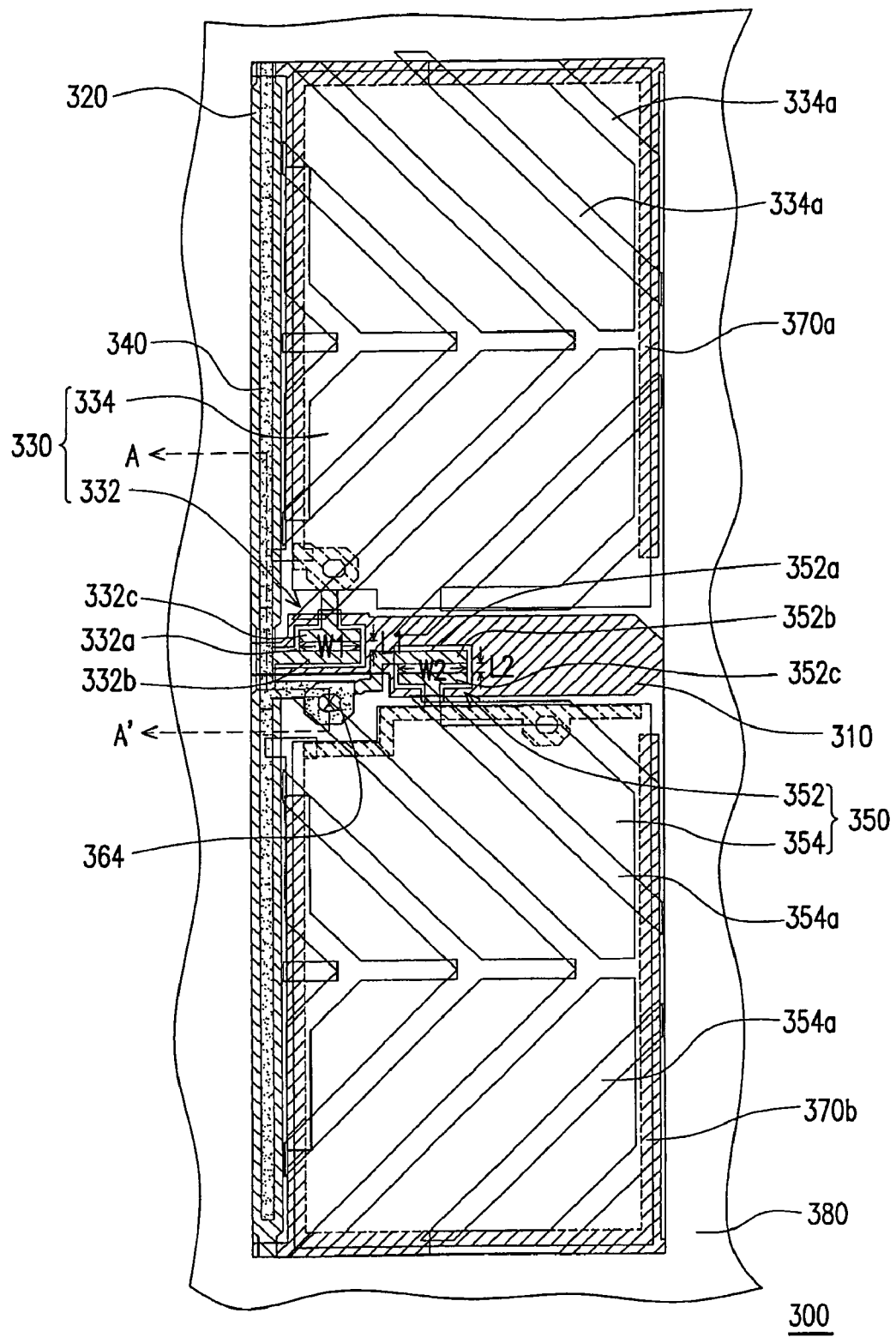
FIG. 5A is a schematic, top view showing a pixel structure according to an embodiment of the present invention.

FIG. 5A is a schematic, top view of a pixel structure according to an embodiment of the present invention. Referring to FIG. 5A, the pixel structure 300 includes a scan line 310, a data line 320, a first sub-pixel 330, a coupling electrode 340 and a second sub-pixel 350. The first sub-pixel 330 includes a first thin film transistor 332 and a first pixel electrode 334, and the first pixel electrode 334 is electrically connected to the scan line 310 and the data line 320 via the first thin film transistor 332. The coupling electrode 340 is disposed above the data line 340 and electrically insulated from the data line 320. The second sub-pixel 350 includes a second thin film transistor 352 and a second pixel electrode 354. The second pixel electrode 354 is electrically connected to the second thin film transistor 352, and the second thin film transistor 352 is electrically connected to the coupling electrode 340.

In this embodiment, the scan line 310 and the data line 320 are disposed on a substrate 380. The first thin film transistor 332 of the first sub-pixel 330 and the second thin film transistor 352 of the second sub-pixel 350 are both formed on the scan line 310 and use a portion of the scan line 310 as their gates. Alternatively, in another embodiment of the present invention, the first thin film transistor 332 and the second thin film transistor 352 disposed on the gate pattern (not shown) are adopted, and the gate pattern is electrically connected to the scan line 310.

Furthermore, the first thin film transistor 332 includes a gate (a portion of the scan line 310), a channel layer 332a, a source 332b and a drain 332c. The channel layer 332a is form on a gate insulating layer 360 (shown in FIG. 5B) covered on the gate, and the source 332b and the drain 332c are formed on the channel layer 332a. The second thin film transistor 352, which has a similar structure to that of the first thin film transistor 332, includes a gate (that is a portion of the scan line 310), a channel layer 352a, a source 352b and a drain 352c. Because the detailed structure of the first thin film transistor 332 and the second thin film transistor 352 can be known and properly changed by those skilled in the art, traditional description is not provided here.

Please refer to FIG. 5A again, the first pixel electrode 334 and the second pixel electrode 354 may have alignment patterns 334a and 354a formed thereon. In one embodiment of the present invention, the alignment patterns 334a and 354a, for example alignment slit patterns, can be formed on the first pixel electrode 334 and the second pixel electrode 354. In another embodiment of the present invention, the alignment patterns 334a and 354a, for example alignment protrusion patterns, can be formed on the first pixel electrode 334 and the second pixel electrode 354. The liquid crystal display panel having the pixel structure 300 then has a wide viewing angle by means of setting the alignment patterns 334a and 354a.

Furthermore, the pixel structure 300 can also include common electrodes 370a and 370b formed on the first pixel electrode 334 and the second pixel electrode 354, respectively. In this way, the common electrodes 370a, 370b define a storage capacitance with the first pixel electrode 334 and the second pixel electrode 354, respectively, so that voltages applied to the first pixel electrode 334 and the second pixel electrode 354 can be maintained for a period of time. Additionally, the first pixel electrode 334, the second pixel electrode 354 and the coupling electrode 340 can be made of transparent conductive materials, such as indium tin oxide (ITO), indium zinc oxide (IZO) or other suitable materials.

It is noted that, as shown in FIG. 5A, the second thin film transistor 352 is electrically connected to the coupling electrode 340 disposed over the data line 320, so that the voltage applied to the first pixel electrode 334 and the second pixel electrode 354 are difference.

Figure 5B:
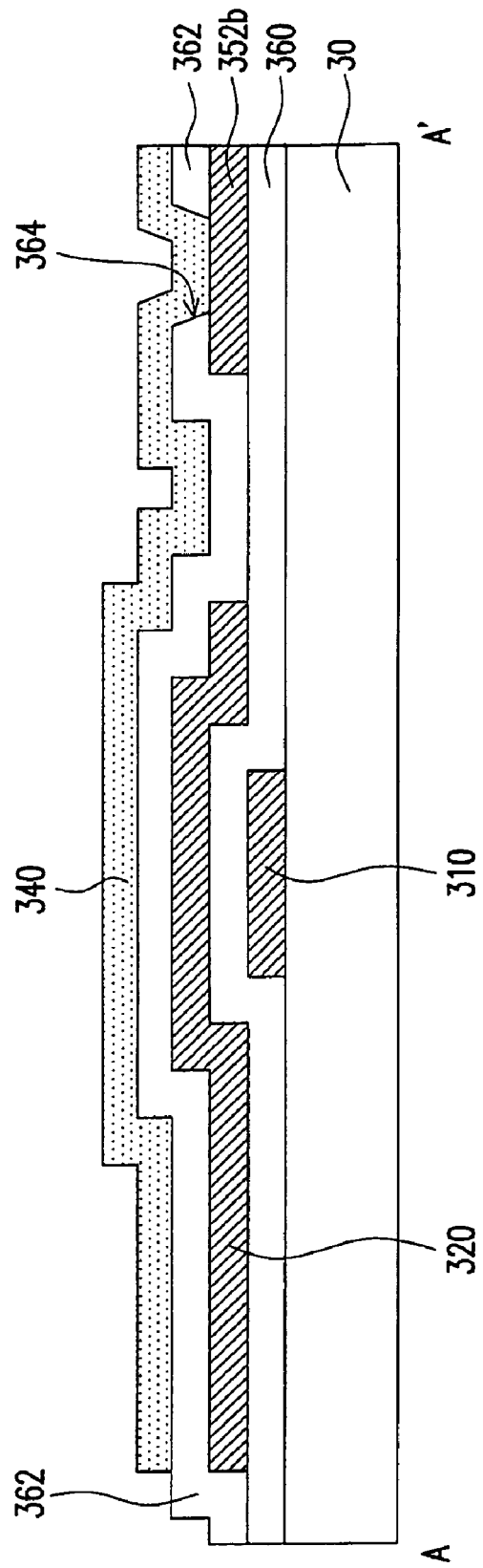
FIG. 5B is a schematic, cross-sectional view taken along the line A-A' of FIG. 5A.

FIG. 5B is a schematic, cross-sectional view taken along the line A-A' of FIG. 5A. Please refer to FIGS. 5A and 5B, a data voltage from the data line 320 is directly applied to the first pixel electrode 334 through the first thin film transistor 332, and the voltage applied to the second pixel electrode 354 is a voltage less than the data voltage, which is produced with the capacitance coupling effect.

In more detail, the source 352b of the second thin film transistor 352 formed on the second pixel 350 can be electrically connected to the coupling electrode 340 via the contact hole 364 formed in the protection layer 362. Because the coupling electrode 340 is disposed over the data line 320, when applying a data voltage to the data line 320, a voltage less than the data voltage is produced due to the capacitance coupling effect between the data line 320 and the coupling electrode 340. And then, the voltage is applied to the second pixel electrode 354 via the second thin film transistor 352.

As mentioned above, the liquid crystal display panel having the pixel structure 300 can use the same data voltage to generate different electric fields in the area of the first pixel electrode 334 and the area of the second pixel electrode 354. So that the liquid crystal molecules (not shown) in the area of the first pixel electrode 334 and the liquid crystal molecules (not shown) in the area of the second pixel electrode 354 tilt along different directions in such a way that eight domain distribution (8 domain) effect can be achieved in the pixel structure 300. By this means, the area of the second pixel electrode 354 is darker in the middle gray level and the low gray level, while the areas of the first pixel electrode 334 and the second pixel electrode 354 have a similar luminance in the high gray level. As a result, the problem of color shift of image can be alleviated when viewing an image on the liquid crystal display panel from a large slant direction.

Figure 3:
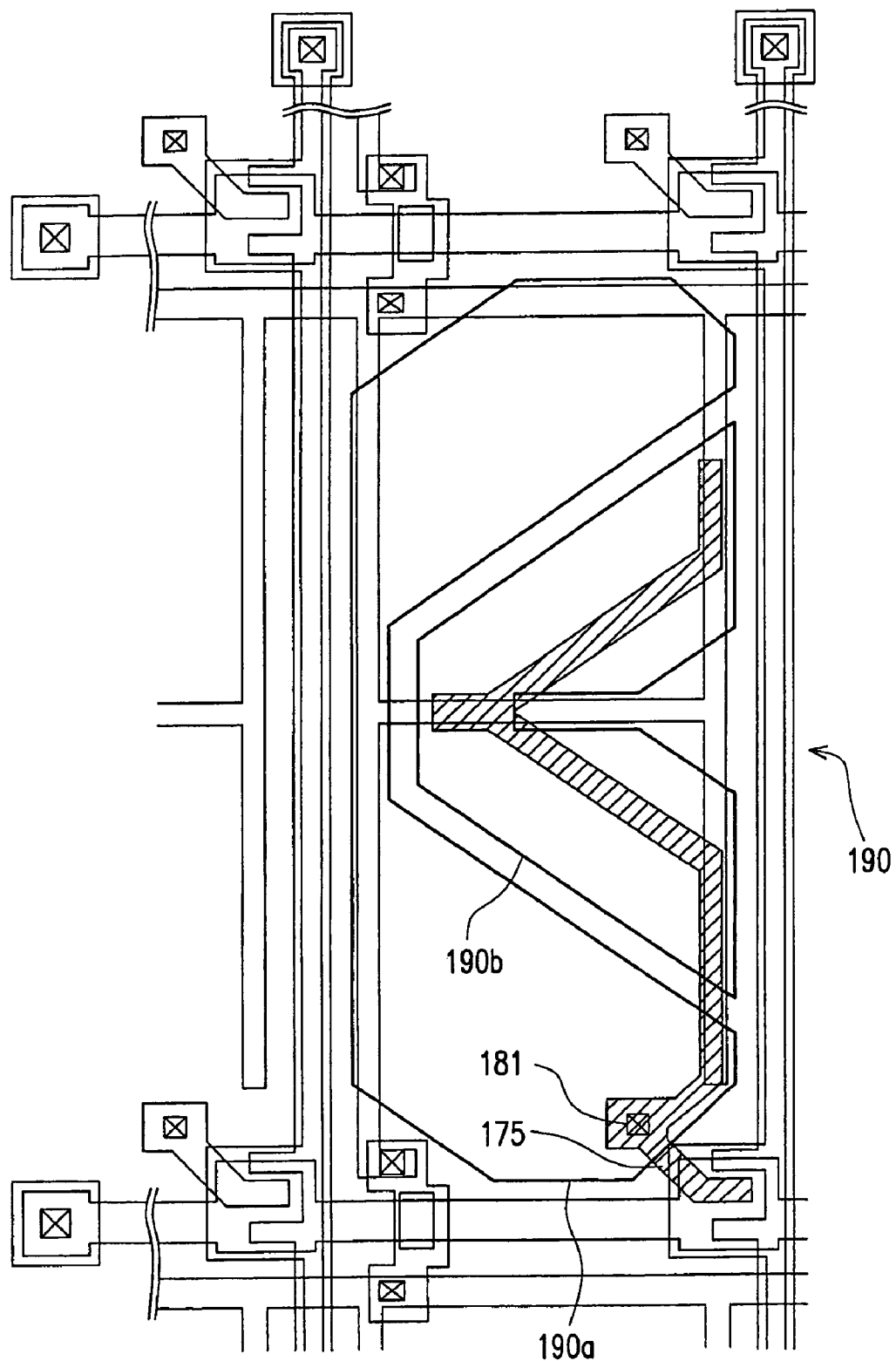
FIG. 3 is a schematic, top view showing a conventional thin film transistor array substrate.
Figure 4:
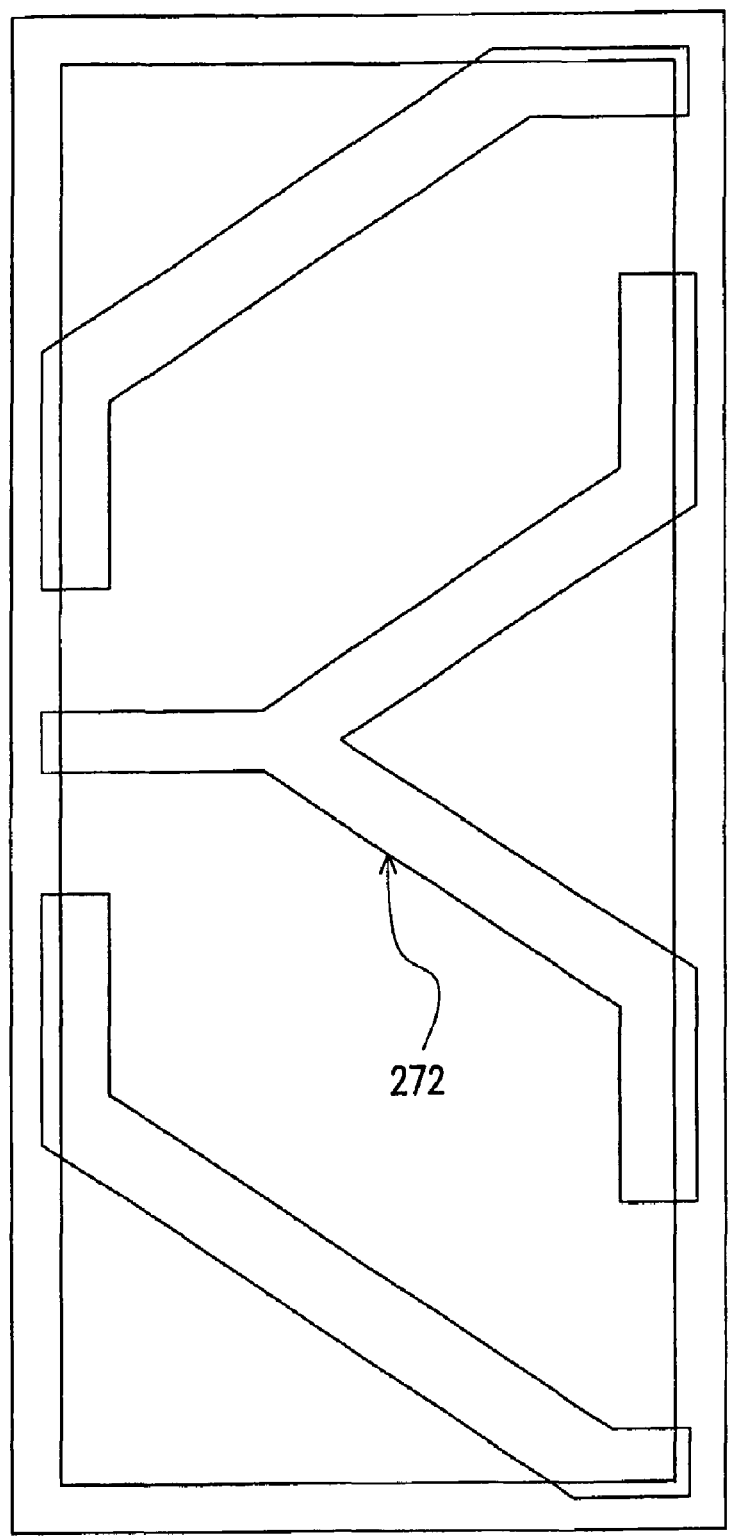
FIG. 4 is a schematic, top view showing a color filter substrate corresponding to the thin film transistor array substrate in FIG. 3.

Particularly, the coupling electrode 340 is disposed over the opaque data line 320. Compared with the prior art in the FIG. 3 and FIG. 4, the problem that the coupling electrode 340 is exposed from the pixel area because of the bad assembly accuracy when assembling the liquid crystal display panel having the pixel structure 300 can be solved. Therefore, the loss of aperture ratio of the liquid crystal display panel having the pixel structure 300 can be prevented.

Moreover, because the coupling electrode 340 is disposed over the data line 320, the coupling capacitance formed between the data line 320 and the common electrode layer 280 (shown in FIG. 12) located on the color filter substrate 620 (shown in FIG. 12) can be reduced. Therefore, the pixel structure 300 facilitate to decrease the occurrence of crosstalk, and the dark fringe at the edges of the first pixel electrode 334 and the second pixel electrode 354 caused by the interference of the electric field of the data line 320 is alleviated.

Please refer to FIG. 5A again, the first thin film transistor 332 may have a first ratio of channel width to channel length W1/L1, the second thin film transistor 352 may have a second ratio of channel width to channel length W2/L2, and the first ratio of W1/L1 is almost equal to the second ratio of W2/L2.

That is to say, the frame voltage difference between the first sub-pixel 330 and the second sub-pixel 350 can be reduced by means of adjusting the first ratio of W1/L1 and the second ratio of W2/L2, to thereby prevent the flicker phenomenon of frame.

Table 1 shows the result that reducing the difference of frame voltage by adjusting the ratio of W/L of thin film transistor.

TABLE 1

| channel width W of thin film transistor (μm) | | difference of frame voltage (mV) | |
|---|---|---|---|
| the first sub-pixel | the second sub-pixel | L255 | L127 |
| 14.70 | 13.70 | 10 | 30 |
| 14.70 | 14.45 | 10 | 4 |

Please refer to Table 1 and FIG. 5A, when the channel width W2 of the second thin film transistor 352 in the second sub-pixel 350 is 13.70 μm, the second sub-pixel 350 then has an enough charging ability. However, the difference of frame voltage in the middle gray level L127 is highly equal to 30 mV, so that the phenomenon of flicker and image sticking appears. Accordingly, by adjusting the channel width W2 of the second thin film transistor 352 to 14.45 μm, the difference of frame voltage is reduced to 4 mV, so as to the problem of flicker and image sticking.

Figure 5C:
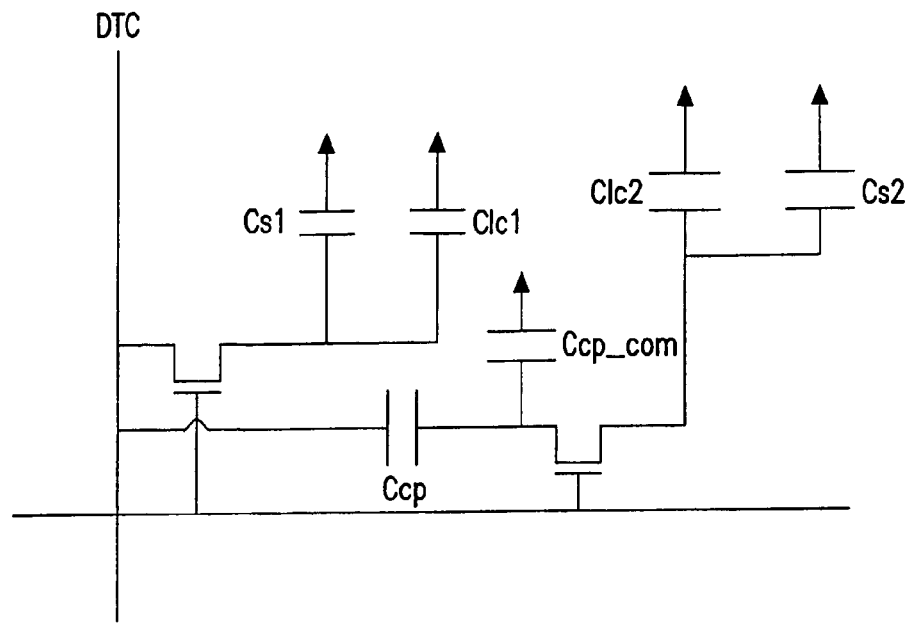
FIG. 5C is a view showing an equivalent circuit of the pixel structure in FIG. 5A.

FIG. 5C is a view showing the equivalent circuit of the pixel structure in FIG. 5A. Please refer to FIG. 5A and FIG. 5C, capacitances $C_{s1}$ and $C_{1c1}$ are formed in the first sub-pixel 330, the capacitance $C_{s1}$ is formed by the first pixel electrode 334 being electrically coupled with the common electrode 370a, the capacitance $C_{1c1}$ is formed by the first pixel electrode 334 being electrically coupled with the common electrode layer 628 (shown in FIG. 12) formed on the color filter substrate 620 (shown in FIG. 12) to which the first pixel electrode 334 faces.

Furthermore, the capacitances such as $C_{s2}$, $C_{1c2}$, $C_{cp}$ and $C_{cp\_com}$ are formed in the second sub-pixel 350. The capacitance $C_{s2}$ is formed by the electrical couple of the second pixel electrode 354 and the common electrode 370b. The capacitance $C_{1c2}$ is formed by the electrical couple of the second pixel electrode 354 and the common electrode layer 628, the common electrode layer 628 (shown in FIG. 12) is disposed on the color filter substrate 620 (shown in FIG. 12) facing to the second pixel electrode 354. The capacitance $C_{cp}$ is formed by the electrical couple of the data line 320 and the coupling electrode 340. The capacitance $C_{cp\_com}$ is formed by the electrical couple of the coupling electrode 340 and the common electrode layer 628 (shown in FIG. 12), the common electrode layer 628 is disposed on the color filter substrate 620 (shown in FIG. 12) facing to the second pixel electrode 354. As shown in FIG. 5C, through the capacitance coupling effect, the voltage applied to the second sub-pixel 350 is different from the voltage applied to the first sub-pixel 330. In addition, the color shift of image can be prevented by changing the ratio of $C_{cp}$ to $(C_{s2}+C_{1c2})$ in the second sub-pixel 350.

Generally, the color shift of image caused by viewing an image from a slant direction is evaluated by the following formula (1):

$$D(\theta, \phi) = \left\{ \frac{|\Delta B_{i,j(on\ axis)} - \Delta B_{i,j(off\ axis)}|}{|\Delta B_{i,j(on\ axis)}|} \right\}_{i,j=0\sim 255} \quad (1)$$

Figure 6:
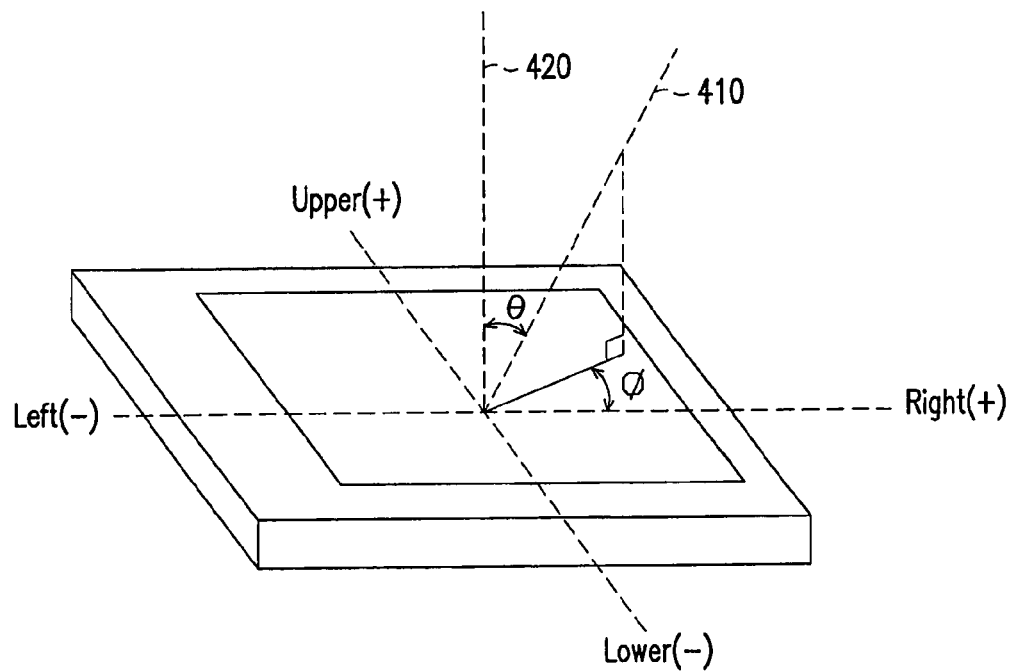
FIG. 6 is a schematic view showing a user seeing a panel.

$D(\theta, \phi)$ is an evaluation value representing improvement degree of color shift; $\Delta Bi,j$ is a difference of brightness of any two gray levels, wherein $\Delta Bi,j_{(on\ axis)}$ is obtained at right view, while $\Delta Bi,j_{(off\ axis)}$ is obtained at slant view. θ is an included angle between the viewing line 410 and the normal line 420 perpendicular to the panel, φ is an included angle between the projection line of the viewing line 410 on the panel and the center horizontal line of the panel, as shown in FIG. 6 which is a schematic view showing a user viewing a panel.

As the value of D getting smaller, the improvement of the color shift of image is more conspicuous. Generally speaking, an MVA liquid crystal display without the design of eight domains of the present invention has a D value of 0.92 indicating a serious color shift of image. However, by changing the ratio of $C_{cp}$ to $(C_{s2}+C_{1c2})$ of the second sub-pixel 350, the value of D is adjustable.

Figure 7:
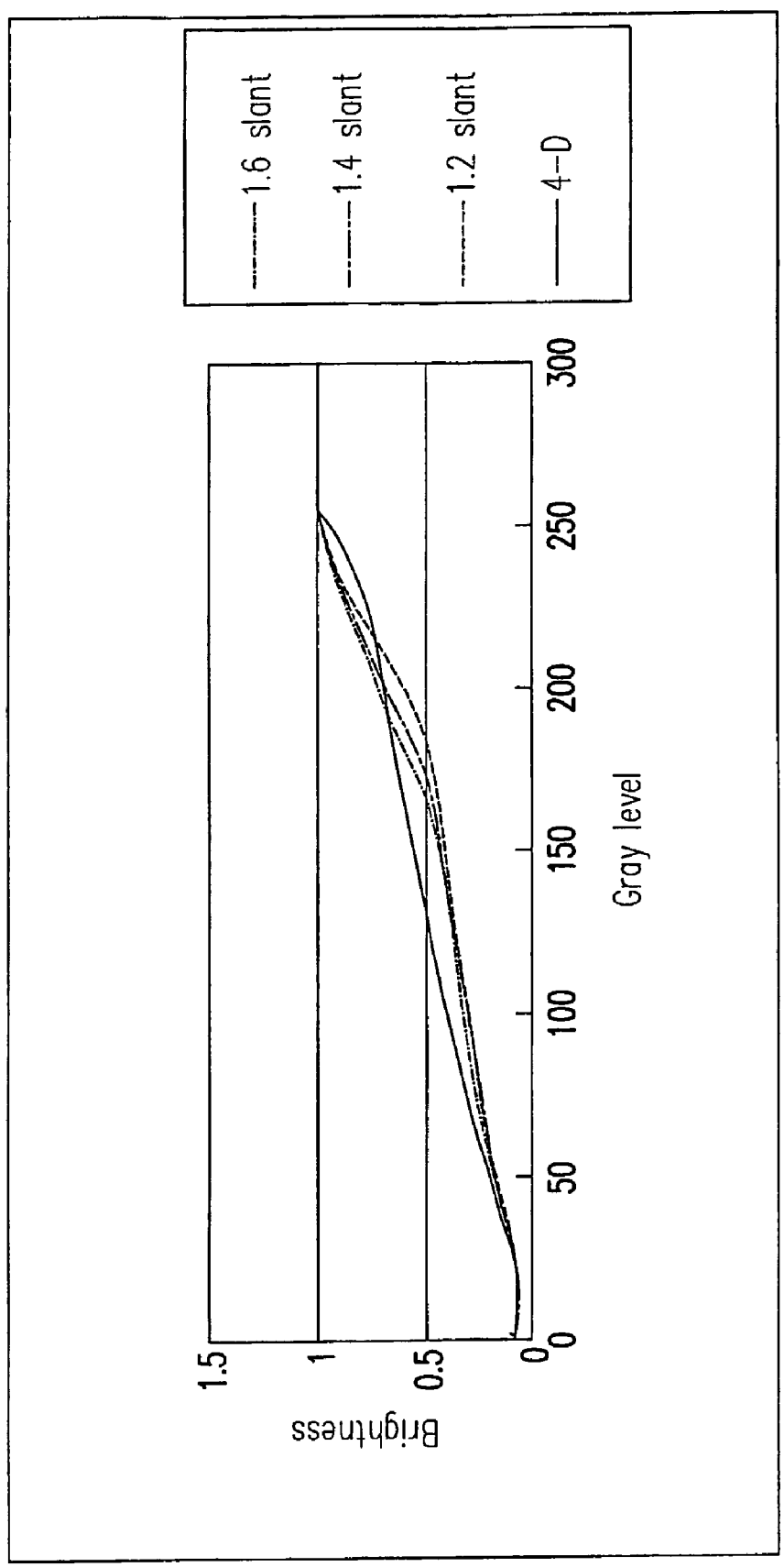
FIG. 7 is a view showing the gamma curves of a liquid crystal display panel having the pixel structure shown in FIG. 5A in the slant directions ($\theta, \phi$)=(60°, 0°), with different ratios of $C_{cp}$ to ($C_{s2}+C_{1c2}$).

FIG. 7 is a view showing the gamma curves of a liquid crystal display panel having the pixel structure shown in FIG. 5A at a slant viewing directions (θ, φ)=(60°, 0°), with different ratios of $C_{cp}$ to $(C_{s2}+C_{1c2})$. Please refer to FIG. 7, the ordinate represents brightness, the abscissa represents gray level, and the ratios of $C_{cp}$ to $(C_{s2}+C_{1c2})$ are 1.6, 1.4 and 1.2 respectively. As shown in FIG. 7, the distortion of the gamma curve of the conventional four-domain (4-D) distribution is very serious, that is the color shift of image is aggravating. However, when the ratio of $C_{cp}$ to $(C_{s2}+C_{1c2})$ is adjusted to 1.6:1, D has a minimum value of 0.46, and the gamma curve is modified to alleviate the color shift of image at a slant viewing angle.

However, when changing the ratio of $C_{cp}$ to $(C_{s2}+C_{1c2})$, the requirement of brightness is also needed to be considered. That is, in order to improve the color shift, the ratio of $C_{cp}$ to $(C_{s2}+C_{1c2})$ is generally decreased to make the value of D decrease. At the same time, the brightness is decreased, which leads to the insufficiency of brightness. On the contrary, in order to increase the brightness by means of increasing the ratio of $C_{cp}$ to $(C_{s2}+C_{1c2})$, the value of D is increased accordingly, which makes the color shift of image become serious.

Figure 8A:
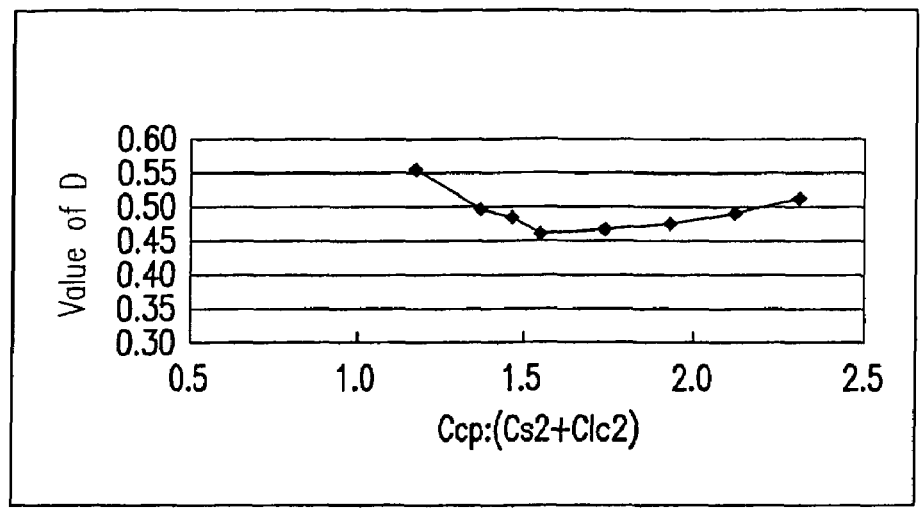
FIG. 8A is a schematic view showing the relation between the ratio of $C_{cp}$ to ($C_{s2}+C_{1c2}$) and the value of D.
Figure 8B:
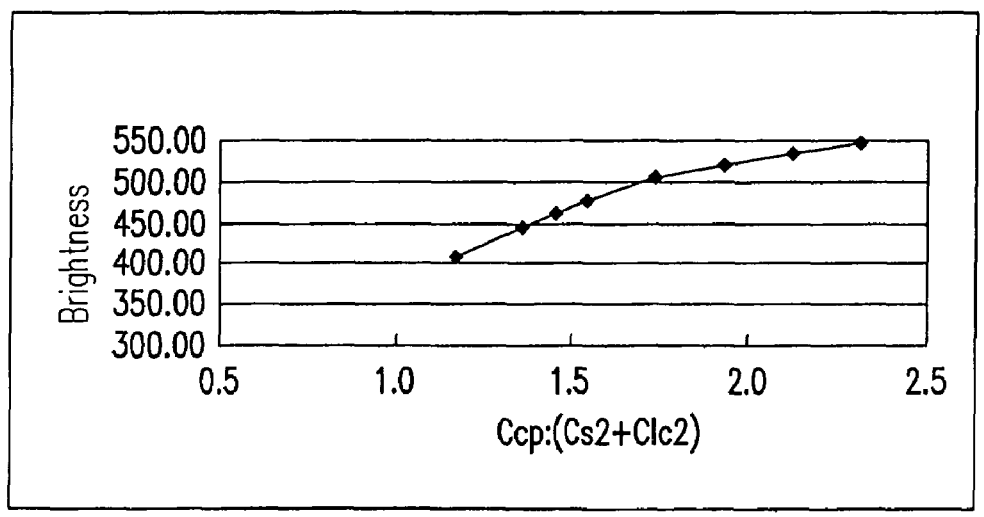
FIG. 8B is a schematic view showing the relation between the ratio of $C_{cp}$ to ($C_{s2}+C_{1c2}$) and the value of brightness.

FIG. 8A is a schematic view illustrating the relation between the ratio of $C_{cp}$ to $(C_{s2}+C_{1c2})$ and the value of D. FIG. 8B is a schematic view illustrating the relation between the ratio of $C_{cp}$ to $(C_{s2}+C_{1c2})$ and the value of brightness. Take the simulation on a television (TV) panel as an example, as shown in FIG. 8A and FIG. 8B, when the ratio of $C_{cp}$ to $(C_{s2}+C_{1c2})$ is adjusted to 2.3:1, D is about 0.51, and the brightness can be increased to 420 nits. Moreover, an dual brightness enhancement film (DBEF) can be used to increase the brightness to 550 nits, so as to meet the requirement of alleviating the color shift of image as well as providing suitable brightness.

Figure 9:
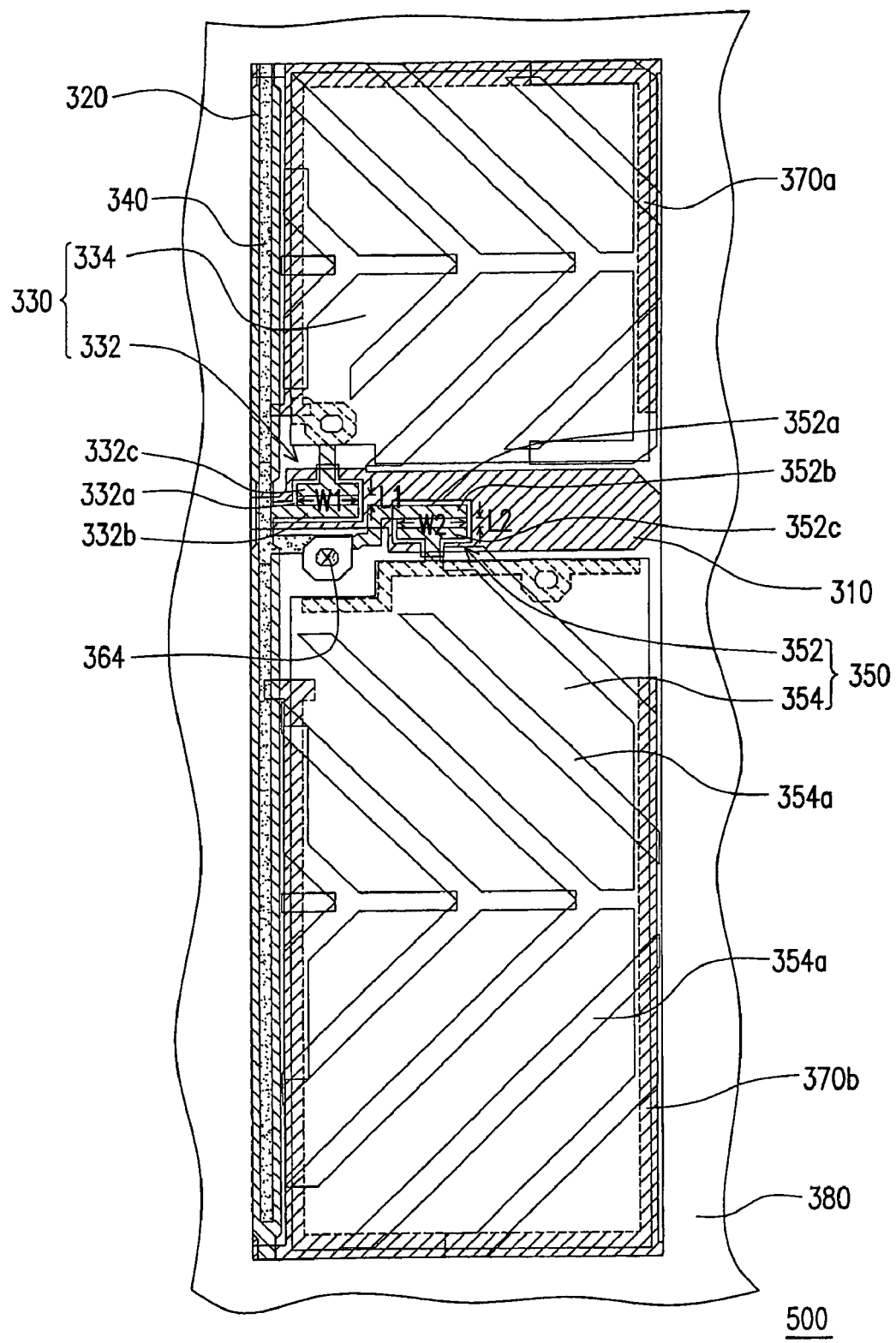
FIG. 9 is a schematic, top view showing another pixel structure according to an embodiment of the present invention.

FIG. 9 is a schematic, top view of a pixel structure according to a preferred embodiment of the present invention. Referring to FIG. 9, since the pixel structure 500 is similar to the pixel structure 300 shown in FIG. 5A, similar elements are referred to the same reference numbers in the specification. The difference between the pixel structure 300 in FIG. 5A and the pixel structure 500 in FIG. 9 is that: in the pixel structure 500 shown in FIG. 9, the area of the first sub-pixel 330 is smaller than that of the second sub-pixel 350.

In more detail, as shown in FIG. 5A and FIG. 9, the area ratio of the first sub-pixel 330 to the second sub-pixel 350 may be in the range from 1:1 to 1:2. The color shift of image can be further alleviated in the same brightness condition, by means of adjusting the area ratio of the first sub-pixel 330 to the second sub-pixel 350. Referring to FIG. 9 again, when the area ratio of the first sub-pixel 330 to the second sub-pixel 350 is 1:2, containment for the gamma curve in the middle gray level and the low gray level can be enhanced, so as to further alleviate the color shift of image.

Figure 10:
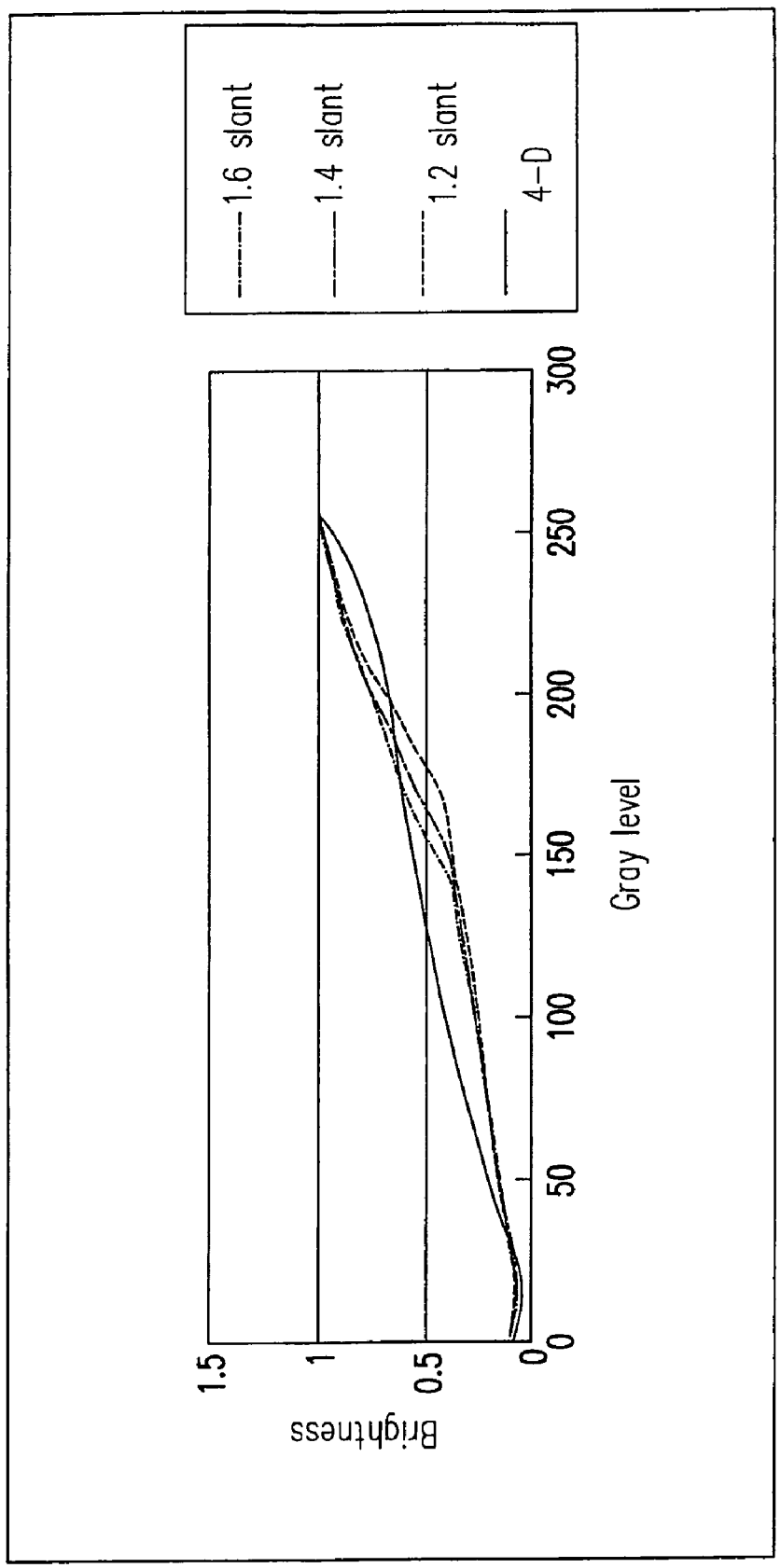
FIG. 10 is a view showing the gamma curves of a liquid crystal display panel having the pixel structure shown in FIG. 9 in the slant directions ($\theta, \phi$)=(60°, 0°), with different ratios of $C_{cp}$ to ($C_{s2}+C_{1c2}$).

FIG. 10 is a view showing the gamma curves of the liquid crystal display panel having the pixel structure shown in FIG. 9 in the slant directions (θ, φ)=(60°, 0°), with different ratios of $C_{cp}$ to $(C_{s2}+C_{1c2})$. Referring to FIG. 10, the ordinate represents brightness, the abscissa represents gray level, and the ratios of $C_{cp}$ to $(C_{s2}+C_{1c2})$ are 1.6, 1.4 and 1.2 respectively. As shown in FIG. 10, the value of D can be changed by modifying the ratio of $C_{cp}$ to $(C_{s2}+C_{1c2})$. Compared with the gamma curve of the conventional four-domain (4-D) distribution, the gamma curve of the liquid crystal display panel having the pixel structure 500 can be modified to eliminate the color shift of image.

Figure 11A:
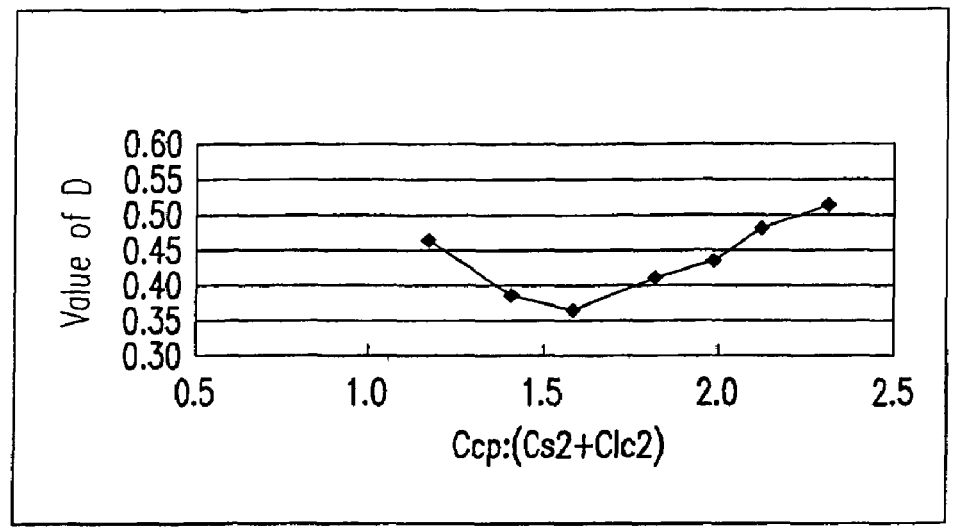
FIG. 11A is a schematic view showing the relation between the ratio of $C_{cp}$ to ($C_{s2}+C_{1c2}$) and the value of D.
Figure 11B:
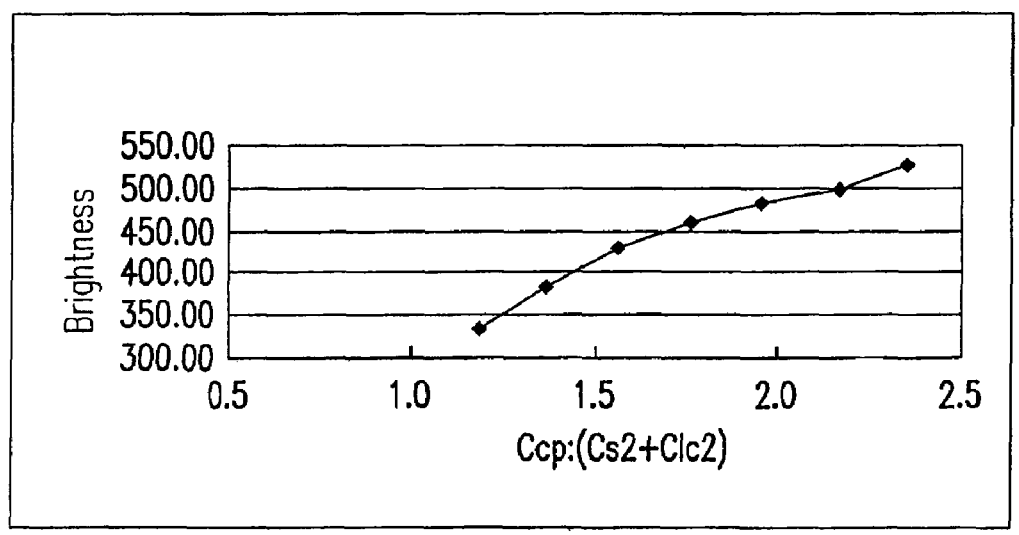
FIG. 11B is a schematic view showing the relation between the ratio of $C_{cp}$ to ($C_{s2}+C_{1c2}$) and the value of the brightness.

FIG. 11 is a schematic view illustrating the relation between the ratio of $C_{cp}$ to $(C_{s2}+C_{1c2})$ and the value of D. FIG. 11B is schematic view illustrating the relation between the $C_{cp}$ to $(C_{s2}+C_{1c2})$ and the brightness. Take the simulation on a TV panel as an example, as shown in FIG. 11A and FIG. 11B, when the ratio of $C_{cp}$ to $(C_{s2}+C_{1c2})$ is adjusted to 1.6:1, D has the minimum value of about 0.36. Though the color shift of image is alleviated, the brightness is still slightly insufficient by having the value of only 290 nit. Thus, the ratio of $C_{cp}$ to $(C_{s2}+C_{1c2})$ can be adjusted to 2.3:1, and the value of D is about 0.52. At this time, though the color shift of image is slightly aggravated, the brightness can be increased to 400 nits. If the DBEF is used at the same time, the brightness can be further increased to 520 nits so as to meet the requirement of alleviating the color shift of image as well as providing a suitable brightness. As can be seen from the above data, through adjusting the area ratio, the value of D can be smaller in the same brightness, so that the color shift of image can be alleviated.

Figure 12:
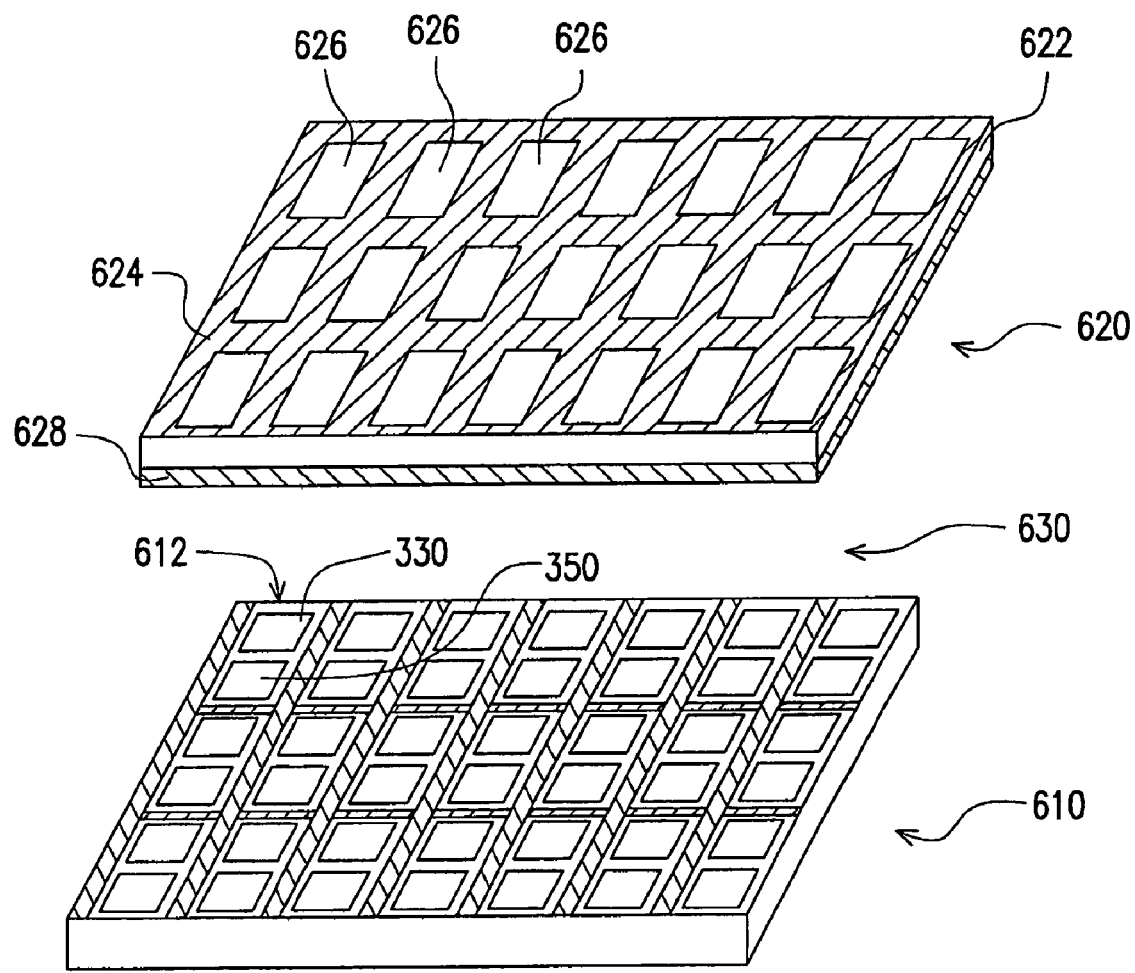
FIG. 12 is a schematic view showing a liquid crystal display panel according to an embodiment of the present invention.

FIG. 12 is a schematic view showing a liquid crystal display panel according to an embodiment of the present invention. The liquid crystal display panel 600 includes a thin film transistor array substrate 610, a color filter substrate 620 and a liquid crystal layer 630. The thin film transistor 610 has a plurality of pixel structure 612, each pixel structure 612, for example, can be the pixel structure 300 in FIG. 5A or the pixel structure 500 in the FIG. 9, and the relative descriptions are not repeated again. The color filter substrate 620 is disposed facing the thin film transistor array substrate 610. The liquid crystal layer 630 is interposed between the thin film transistor array substrate 610 and the color filter substrate 620.

As shown in FIG. 5A, it is noted that the voltage applied to the second sub-pixel 350 and the voltage applied to the first sub-pixel 330 can be made different by utilizing the capacitance coupling effect of the coupling electrode 340 and the data line 320. Thus, eight-domain (8-D) distribution effect can be achieved in the pixel structure 300. By this means, the second sub-pixel 350 is darker in the middle gray level and the low gray level, while the first sub-pixel 330 and the second sub-pixel 350 have similar luminance in the high gray level. As a result, when seeing an image from a slant direction, the color shift of image can be alleviated.

Referring to FIG. 12 again, the color filter substrate 620 includes a substrate 622, a black matrix 624, a color filter layer 626 disposed on the substrate 622, and a common electrode layer 628. The color filter layer 626, for example, is consisted of filter patterns of red color, green color and blue color. The black matrix 624 is made of the materials, such as metal or black resin. The common electrode layer 628 is disposed over the black matrix 624 and the color filter layer 626, and is used to generate a electric field with the first sub-pixel 330 and the second sub-pixel 350 of the thin film transistor array substrate 610, to make the liquid crystal molecules in the liquid crystal layer 630 twist so as to display images.

In one embodiment of the present invention, the color filter substrate 620 further includes an alignment protrusion pattern (not shown) or an alignment slit pattern (not shown). The alignment protrusion pattern or the alignment slit pattern is used together with the alignment pattern formed on the pixel structure 612 of the thin film transistor array substrate 610 to achieve the effect of the wide viewing angle. The alignment pattern can be an alignment slit pattern or an alignment protrusion pattern. Of course, the embodiment of the present invention is not intended to limit the formation way and shape of the alignment protrusion pattern or the alignment slit pattern, which may be the structure for MVA or other else.

According to the liquid crystal display panel 600 using the pixel structure 300 and the pixel structure 500 of the present invention can alleviate the color shift of image, avoid the loss of aperture ratio, prevent the flicker phenomenon of frame and make it easy to adjust the area ratio of the sub-pixels.

As mentioned above, the pixel structure and the liquid crystal display panel of the present invention have the following advantages:

(1) The color shift of image can be improved by means of forming the first sub-pixel and the second sub-pixel on a pixel structure, and making the voltage of the first sub-pixel different from the voltage of the second sub-pixel by using the capacitance coupling effect of the coupling electrode and the data line.

(2) Because the coupling electrode is disposed over the data line, when assembling the liquid crystal display panel, it can avoid the loss of aperture ratio due to the exposure of the coupling electrode from the pixel region caused by the assembly shift.

(3) The capacitance formed by the electrical couple of the data line and the common electrode layer of the color filter substrate can be reduced by utilizing the shielding effect of the coupling electrode. Thus, the crosstalk can be alleviated and the dark fringe due to the effect from the data line to the first pixel electrode and the second pixel electrode can be eliminated.

(4) By adjusting the width-to-length ratio of channel of the first thin film transistor and the second thin film transistor, the frame voltage difference of the first sub-pixel and the second sub-pixel can be reduced, so as to solve the problem of flicker of frame.

(5) It is easy to adjust the area ratio of the first sub-pixel to the second sub-pixel by applying the pixel structure of the present invention, so as to meet the requirement of alleviating the color shift of image as well as providing a suitable brightness.

(6) Better brightness and the alleviation of color shift of image can be achieved by adjusting the ratio of $C_{cp}$ to $(C_{s2}+C_{1c2})$ It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure, comprising:
    a scan line and a data line;
    a first sub-pixel, comprising:
        a first thin film transistor;
        a first pixel electrode, electrically connected to the scan line and the data line via the first thin film transistor;
    a coupling electrode, disposed over the data line and electrically insulated from the data line; and a second sub-pixel, comprising:
  a second thin film transistor;
  a second pixel electrode, electrically connected to the second thin film transistor, the second thin film transistor being electrically connected to the coupling electrode;
wherein, the scan line divides the pixel structure into the first sub-pixel and the second sub-pixel; and parts of the scan line are gates of the first and second thin film transistors.

2. The pixel structure of claim 1, wherein a channel of the first thin film transistor has a first width-to-length ratio, a channel of the second thin film transistor has a second width-to-length ratio, and the first width-to-length ratio is substantially equal to the second width-to-length ratio.

3. The pixel structure of claim 1, wherein an area ratio of the first sub-pixel to the second sub-pixel is in the range from 1:1 to 1:2.

4. The pixel structure of claim 1, wherein the first pixel electrode and the second pixel electrode further comprise an alignment slit pattern.

5. The pixel structure of claim 1, further comprising an alignment protrusion pattern formed on the first pixel electrode and the second pixel electrode.

6. The pixel structure of claim 1, further comprising a common electrode disposed below the first pixel electrode and the second pixel electrode.

7. The pixel structure of claim 1, wherein the material of the coupling electrode comprises a transparent conductive material.

8. A liquid crystal display panel, comprising:
  a thin film transistor array substrate having a plurality of pixel structures, each pixel structure comprising:
    a scan line and a data line;
    a first sub-pixel comprising:
      a first thin film transistor;
      a first pixel electrode electrically connected to the scan line and the data line via the first thin film transistor;
    a coupling electrode disposed over the data line;
    a second sub-pixel comprising:
      a second thin film transistor;
      a second pixel electrode electrically connected to the second thin film transistor, the second thin film transistor electrically connected to the coupling electrode,
  wherein, the scan line divides the pixel structure into the first sub-pixel and the second sub-pixel; and parts of the scan line are gates of the first and second thin film transistors;
  a color filter substrate disposed opposite to the thin film transistor array substrate; and
  a liquid crystal layer interposed between the thin film transistor array substrate and the color filter substrate.

9. The liquid crystal display panel of claim 8, wherein a channel of the first thin film transistor has a first width-to-length ratio, a channel of the second thin film transistor has a second width-to-length ratio, and the first width-to-length ratio is substantially equal to the second width-to-length ratio.

10. The liquid crystal display panel of claim 8, wherein an area ratio of the first sub-pixel to the second sub-pixel is in the range from 1:1 to 1:2.

11. The liquid crystal display panel of claim 8, wherein the first pixel electrode and the second pixel electrode of the pixel structure further comprise an alignment slit pattern.

12. The liquid crystal display panel of claim 8, wherein the thin film transistor array substrate further comprises an alignment protrusion pattern formed on the first pixel electrode and the second pixel electrode.

13. The liquid crystal display panel of claim 8, wherein the color filter substrate further comprises an alignment protrusion pattern formed thereon.

14. The liquid crystal display panel of claim 8, wherein the color filter substrate further comprises an alignment slit pattern formed thereon.

15. The liquid crystal display panel of claim 8, wherein each pixel structure further comprises a common electrode formed below the first pixel electrode and the second pixel electrode.

16. The liquid crystal display panel of claim 8, wherein the color filter substrate further comprises a common electrode layer.

17. The liquid crystal display panel of claim 8, wherein the material of the coupling electrode comprises a transparent conductive material.

* * * * *